Nov. 23, 1926.
G. H. DE BORDE
GREASE DISPENSER
Filed August 24, 1925
1,608,059
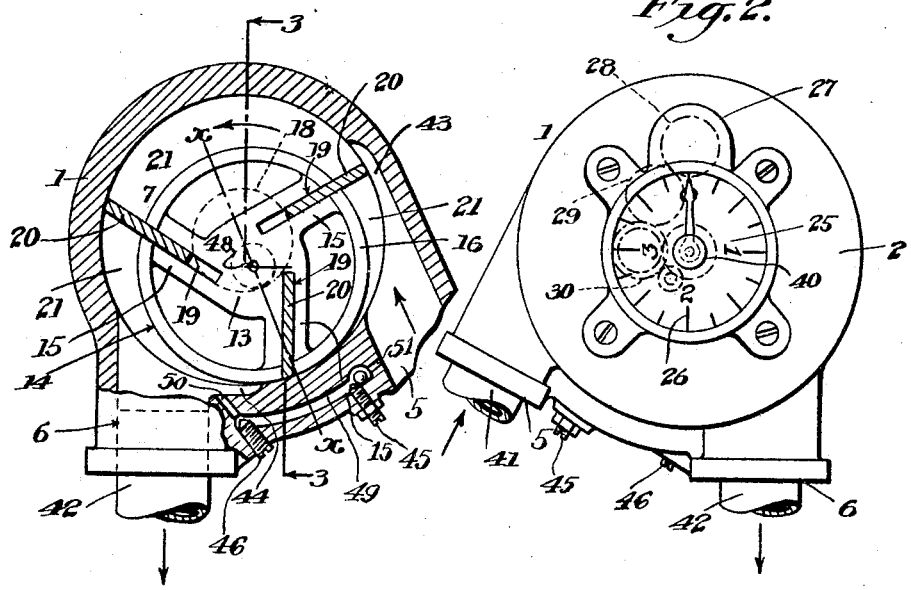
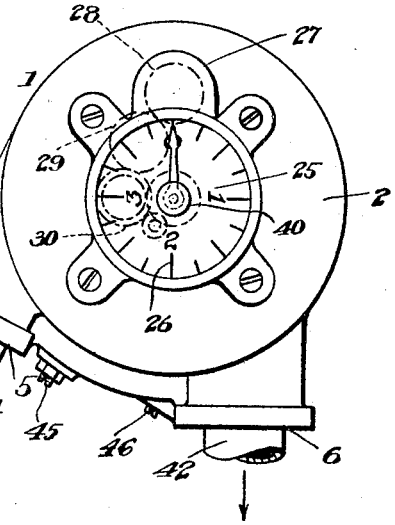
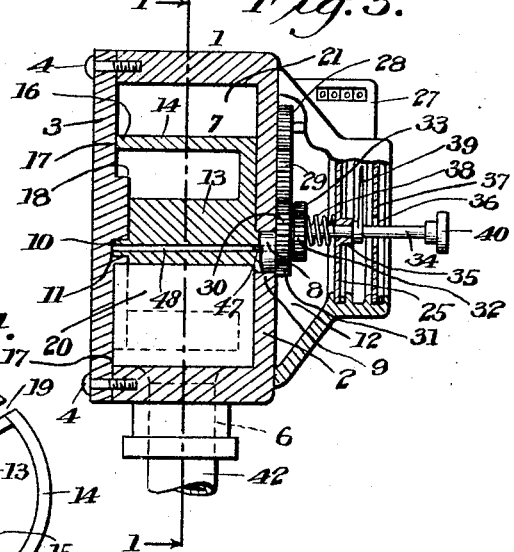
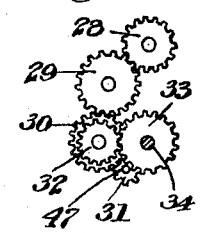
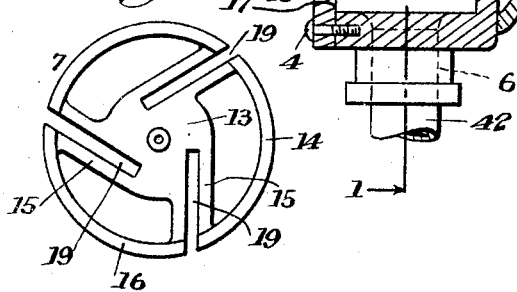
INVENTOR:
George H. DeBorde,
BY
Robt. W. Pearson
ATTORNEY.

Patented Nov. 23, 1926.

1,608,059

UNITED STATES PATENT OFFICE.

GEORGE H. DE BORDE, OF LOS ANGELES, CALIFORNIA, ASSIGNOR TO VICTOR C. THOMPSON, OF LOS ANGELES, CALIFORNIA.

GREASE DISPENSER.

Application filed August 24, 1925. Serial No. 52,059.

My invention relates to meters, and more particularly to meters for measuring and recording heavy liquids, such as greases dispensed and sold at oil service stations.

An important object of the invention is to provide a meter as above stated which will be leak-proof, will have less friction in its working parts, will offer less resistance to the liquid flowing therethrough, will be simple in construction and positive, accurate and highly efficient in operation.

Other objects and advantages will appear hereinafter.

My invention is illustrated in the annexed drawing, forming a part of this specification, in which:

Figure 1 is a transverse section of my meter taken on the line 1—1 of Figure 3.

Figure 2 is a front view of my meter.

Figure 3 is a vertical longitudinal section of my meter taken on line 3—3 of Figure 1.

Figure 4 is an end view of the rotor.

Figure 5 is a face view of the meter gearing.

In the drawing 1 indicates a cylindrical casing closed at its front end by a wall 2 integral therewith and its rear end by a detachable wall 3 secured thereto by screws 4, the casing being provided in its side wall with an inlet 5 and an outlet 6.

In the casing 1 a cylindrical rotor 7 is concentrically journaled at its forward end by a journal 8 and bearing 9 and at its rear end by a journal 10 and bearing 11, the bearing 9 being located in the front wall 2 and the bearing 11 being located in the rear wall 3. The journal 8 extends through the front wall 2 into a meter compartment 12 formed on the front of said wall. The rotor 7 is formed with a hub 13, a cylindrical shell or rim 14, a plurality of spokes 15 joining said hub and rim and extending from end to end of the rotor, and an annular flange 16 extending from the rear end of the rotor at the periphery thereof, which flange bears against the inside of the rear wall 3 forming an end thrust bearing 17. The axis of the rotor and its hub are on a line $x$—$x$ drawn through the center of the casing 1 midway between the ports 5 and 6 and the location of said axis is such that the periphery of the shell 14 contacts with the inner periphery of the casing between said ports. The spokes 15 are offset to one side of the axis of the rotor and extend tangential to the hub 13. On the inside of the rear wall 3 is formed a circular guide 18 concentric with the casing 1, which guide extends within the rotor rear end flange 16 against the rear end of the hub 13 and spokes 15. The rotor is provided with a plurality of slots 19 which extend through the rim 14 and spokes 15, respectively, to the hub 13, in which slots are slidably mounted a plurality of blades 20, respectively, the inner ends of which blades engage the periphery of the guide 18 whereby the blades are guided so that their outer edges are maintained in contact with the inner periphery of the casing 1 in all positions of the rotor 7 and at all times. The blades 20 form a plurality of grease chambers 21.

In the meter compartment 12 is mounted a dial 25 on the face of which are graduations 26. In the upper part of the meter compartment 12 is located a recording device 27 which carries a gear 28 in mesh with a gear 29 journaled in said casing member behind the dial 25, on the front casing wall 2. The gear 29 also meshes with a gear 30 journaled in the casing member behind the dial 25 on the wall 2 in mesh with a pinion 31 mounted on the forward end of the journal 8 by the pin 47, which pin is secured in the bore 48. A gear 32 is secured on the gear 30 in mesh with a gear 33 secured on a spindle 34 behind the dial 25 which spindle is journaled in a bearing 35 on said dial and extends through an opening 36 in the glass 37 which is secured in the meter compartment 12 over the dial 25. A spring 38 surrounds the spindle 34 between the dial 25 and gear 33 for normally maintaining said gear in mesh with the gear 32. An indicator hand 39 is secured on the spindle 34 in front of the dial 25 for sweeping the face of the dial. A thumb wheel 40 is secured on the outer end of the spindle 34 for drawing the spindle forwardly against the compression of the spring 38 to unmesh the gear 33 from the gear 32, and for then turning the spindle and indicator hand 39 backward to its zero position when it is desired to measure another amount of grease dispensed through the meter.

The inlet 5 is connected to a pipe 41 leading from a grease dispenser and controlled by a valve, not shown, while the outlet 6 is connected to a dispensing hose 42.

The casing 1 is provided with a circumferential groove 43 in its inner periphery leading from the inlet 5 and a circumferential groove 44 leading from the outlet 6 in the direction of rotation of the rotor 7. The groove 43 allows the grease to be taken freely into the grease chambers 21 to insure a full amount of grease in said chambers, while the groove 44 prevents choking of the grease behind the rotor.

It will be noted that the blades 20 extend at an acute angle to the inner periphery of the casing 1 in the direction of rotation of the rotor, which has a tendency to draw the ends of the blades out against the inner surface of the casing, thus enabling the blades to pass freely over said surface and making leak-proof joints between the outer ends of the blades and said surfaces.

The passages 51, 49 and 50 are connected together between the ports 5 and 6. A check valve 45 is positioned between the passages 51 and 49, and a valve 46 is positioned in the passage 49 to adjustably control the flow of fluid passing through to the passage 50 to the port 6.

The operation of my meter is as follows:

The dispensing hose 42 being led to the point of discharge into an automobile differential, gear, or crank case, or other grease container, and the dispenser valve, not shown, being opened, the grease under pressure passes from the dispenser through the pipe 41, through the inlet 5 into the grease chambers 21, 19 in the casing 1, whereupon the rotor 7 is rotated by the flow of the greases in a counter-clockwise direction and the grease is conducted around the casing by the rotor and delivered through the outlet 6 and dispensing hose 42.

The rotation of the rotor 7 through the medium of the journals 8 and 10, pinion 31, and gears 30, 32 and 33, rotates the indicator hand 39 over the dial 25 whereby the amount of grease dispensed is visibly indicated, while the recording device 27 is operated, through the journal 8, pinion 31, and gears 30, 29 and 28, whereby the amount of grease dispensed is recorded.

After each dispensation of grease the gear 33 is drawn out of mesh with the gear 32 and the indicator hand 39 may be turned back to zero to indicate the next amount of grease dispensed.

The recording device adds each amount of grease dispensed and gives the record of the total amount of grease dispensed.

When it is desired to adjust the relation between the measurement chambers with the recording device of the meter, a predetermined amount of fluid is permitted to flow from the port 5 to the port 6, through the passage 51, past the check valve 45 through the passage 49 and past the valve 46, respectively, by adjusting the said valve 46 to the proper passage of fluid therethrough, and the pressure of the fluid from the port 6 is prevented from passing back from the port 6 to the port 5 by the automatic closing of the check valve 45. Therefore, should there be an undersupply of fluid passing through the chambers 21 in proportion to the amount being recorded by the device 27, the said under supply may be regained by admitting the required amount of fluid direct from the port 5 to the port 6 through the passage 51, the check valve 45, the passage 49, the valve 46, and the passage 50, respectively to the said port 6.

I claim—

1. In a meter as described, a casing provided with an inlet and an outlet, a rotor journaled eccentrically in said casing in contact therewith between said inlet and said outlet, said rotor being provided with a plurality of slots extending through the periphery thereof, blades slidably mounted in said slots, a guide in said casing engaging the inner ends of said blades and maintaining the outer ends thereof in contact with the casing, the casing being provided with a by-pass leading from said inlet to said outlet, and a check valve in said by-pass.

2. In a meter as described, a casing provided with an inlet and an outlet, a rotor journaled eccentrically in said casing in contact therewith between said inlet and said outlet, said rotor being provided with a plurality of slots extending through the periphery thereof, blades slidably mounted in said slots, a guide in said casing engaging the inner ends of said blades and maintaining the outer ends thereof in contact with the casing, the casing being provided with a by-pass leading from said inlet to said outlet, a check valve in said by-pass, and a regulating valve in said by-pass.

In testimony whereof I hereunto affix my signature.

GEORGE H. DE BORDE.